(12) United States Patent
Liberfarb

(10) Patent No.: US 6,966,329 B2
(45) Date of Patent: Nov. 22, 2005

(54) PROPORTIONAL PILOT-OPERATED FLOW CONTROL VALVE

(75) Inventor: Zilek Liberfarb, Buffalo Grove, IL (US)

(73) Assignee: HydraForce, Inc., Lincolnshire, IL (US)

( * ) Notice: Subject to any disclaimer, the term of this patent is extended or adjusted under 35 U.S.C. 154(b) by 9 days.

(21) Appl. No.: 10/764,973

(22) Filed: Jan. 26, 2004

(65) Prior Publication Data

US 2004/0154672 A1 Aug. 12, 2004

Related U.S. Application Data

(60) Provisional application No. 60/442,771, filed on Jan. 27, 2003.

(51) Int. Cl.[7] ............................................. G05D 7/06
(52) U.S. Cl. .................. 137/115.05; 137/501
(58) Field of Search ...................... 137/115.05, 115.15, 137/115.18, 501

(56) References Cited

U.S. PATENT DOCUMENTS

| | | | | |
|---|---|---|---|---|
| 3,596,677 A | * | 8/1971 | Clark et al. ................. | 137/501 |
| 4,121,610 A | * | 10/1978 | Harms et al. .......... | 137/115.05 |
| 4,462,566 A | * | 7/1984 | French ....................... | 137/501 |
| 5,000,220 A | * | 3/1991 | Eick et al. ................... | 137/501 |
| 6,167,906 B1 | * | 1/2001 | Liberfarb .................... | 137/501 |

* cited by examiner

Primary Examiner—Gerald A. Michalsky
(74) Attorney, Agent, or Firm—Leydig, Voit & Mayer, Ltd.

(57) ABSTRACT

A proportional, pilot-operated flow control valve is disclosed which can include a cage, a hollow compensating spool slidably disposed within the cage, a hollow metering guide member slidably disposed within the compensating spool, a regulating spool slidably disposed within the guide member, a dampening guide slidably disposed inside the compensating spool to define a dampening chamber, a compensating spring disposed inside the dampening chamber and arranged to urge the dampening guide to engage the metering guide and the compensating spool to engage the cage, a regulating spring disposed inside the regulating spool and urging the regulating spool to abut the dampening guide, and a cartridge, the cartridge having a pilot valve assembly and an adaptor, the adaptor mounted to the cage, the pilot valve assembly mounted to the adaptor, the pilot valve assembly including an actuator.

16 Claims, 3 Drawing Sheets

PROPORTIONAL PILOT-OPERATED FLOW CONTROL VALVE

CROSS-REFERENCE TO RELATED PATENT APPLICATIONS

This patent application claims the benefit of priority to U.S. Provisional Patent Application No. 60/442,771, filed Jan. 27, 2003, and entitled "Proportional Pilot-Operated Flow Control Valve," which is incorporated in its entirety herein by this reference.

FIELD OF THE INVENTION

The present invention relates generally to valves and, more particularly, to proportional, pilot-operated flow control valves.

BACKGROUND OF THE INVENTION

Flow control valves are used to regulate fluid flow through piping systems and the like. Proportional flow control valves are intended to provide a regulated flow rate proportional to a control signal. A proportional flow control valve typically includes a regulating spool activated by a solenoid to obtain an adjustable opening. A proportional valve can come in several different styles, such as, surface mounted valves, so-called CETOP valves, sectional valves, and cartridge-style valves, for example. In addition to a proportional valve, a pressure compensator is usually used in a hydraulic system to provide a fairly constant flow over a range of pressures induced by different loads.

SUMMARY OF THE INVENTION

The present invention provides a novel, preferably cartridge-type, proportional pilot-operated flow control valve for high flow and pressure applications which uses a small, low-power pilot actuator to control the displacement of the main regulating spool and also including a built-in pressure compensator. The present invention provides a cost effective pilot-operated proportional flow control valve having a highly versatile design. The control valve allows "finger-tip" control of the high-power flow control device, imparting desired flow control characteristics regardless of load conditions.

A cartridge-style valve is advantageous in that it can be used in a single compact manifold together with many other valves to enable full hydraulic control of a machine. Also a cartridge-style valve can accommodate a built-in pressure compensator which makes it even more cost effective compared to the other previously mentioned types.

At high levels of flow and pressure rates, the flow forces can become quite significant. A powerful, high-precision proportional actuator is desirable to control the position of the regulating spool at these conditions.

The features of the present invention will become apparent to one of ordinary skill in the art upon reading the detailed description, in conjunction with the accompanying drawings, provided herein.

DETAILED DESCRIPTION OF EMBODIMENTS OF THE INVENTION

Figure 1:
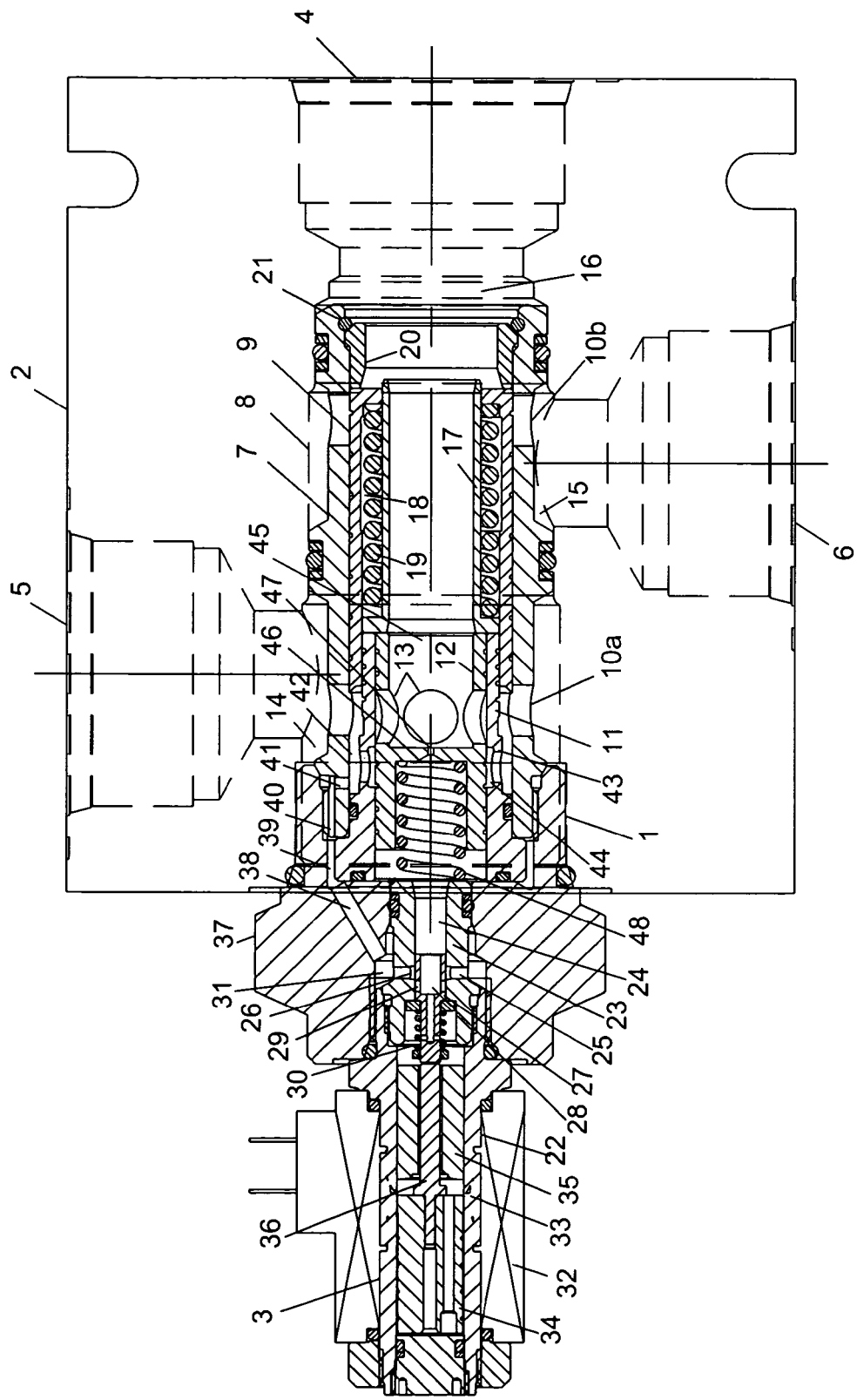
FIG. 1 is an elevational section view of a valve according to the present invention with the valve being a "normally-closed" type and having an electromagnetic actuator.

In accordance with the teachings of the present invention, there is provided an embodiment of a proportional pilot-operated flow control valve. Referring to FIG. 1, the inventive flow control valve can include a valve assembly 1, which is supported by a housing 2 at one end and confines an electromagnetic actuator 3 at the other end. The housing has an input port 4 which can be connected to a source of pressurized fluid, a priority flow port 5 which can be connected to a cylinder or a hydraulic motor, for example, and a bypass port 6 which can be connected to a tank or used as a pressurized fluid supply for auxiliary functions, for example.

The valve assembly 1 can include a hollow cage 7 that cooperates with a cavity 8 formed in the housing 2 to define a plurality of internal chambers, a hollow compensating spool 9 slidably arranged within the cage 7 between rows of cross holes 10 formed in the cage 7, a hollow metering guide member 11 slidably arranged within the compensating spool 9, and a regulating spool 12 with metering cross holes 13 slidably arranged within the guide member 11. One 10a of the rows of the cage cross-holes 10 is open to a first housing chamber 14 connected to the priority flow port 5, the other 10b is open to a second housing chamber 15 connected to the by-pass flow port 6. The open end of the hollow cage 7 on the side opposite to the actuator is open to a third housing chamber 16 connected to the inlet port 4.

A dampening guide 17 can be slidably arranged inside the compensating spool 9 to create a dampening chamber 18 between the stepped surfaces of the spool 9 and the dampening guide 17. A compensating spring 19, arranged inside of the dampening chamber 18, urges the dampening guide 17 to engage the metering guide 11 on one side and urges the compensating spool 9 in the opposite direction toward the inlet port 4 to a stop defined by an insert 20 and a retaining ring 21 arranged inside of the cage 10.

The valve assembly 1 can include a pilot valve 22 comprising a pilot cage 23 with an axial hole 24 and a plurality of cross holes 25 connected with a groove 26 defined by the pilot cage 23 and facing a pilot spool 27. The pilot spool 27 can include an axial hole 28 and a plurality of cross holes 29 and can be slidably arranged within the pilot cage 23. The pilot valve 22 can include a pilot spring 30, for urging the pilot spool 27 into an initial defined position, and the electro-magnetic actuator 3. The actuator 3 can include a solenoid coil 32 wound around a hollow tube 33, a moveable plunger or armature 34 slidably arranged within the tube, a pole piece 35 anchored within the tube, and a push pin 36 attached to and extending from the plunger and engaging the pilot spool 27 of the pilot valve 22.

The pilot cage 23 with the parts installed therein and the electromagnetic actuator 3 creates a pilot valve assembly unit 22. This unit preferably is threaded into an adaptor 37 on one side thereof with the other side of the adaptor threadedly engaged with the cage 7. The adaptor, the threaded pilot unit, the cage, and other parts installed therein create a single assembly unit, commonly referred to as a "cartridge."

A cavity 31 defined by the pilot valve and the adaptor 37 is connected by at least one hole 38 in the adaptor 37, a cavity 39 arranged outside of the metering guide shoulder, a groove 40 and a plurality of holes 41 in the hollow cage 7 to the cavity 42 inside of the cage 7, which is arranged between the cage 7, the metering guide 11, and the compensating spool 9.

The metering guide 11 has a plurality of cross-holes 43 formed therein and an internal groove 44 facing the outside diameter of the regulating spool 12. The side of the spool 12 that includes the cross holes 43 is open to a cavity 45 facing the internal part of the dampening guide 17 and is separated from the opposite side of the regulating spool by a wall 46 with a fixed orifice 47. The opposite side of the regulating spool 12 opens to the pilot cage 23 which has the pilot spool 27 disposed therein.

A regulating spring 48 arranged inside of the regulating spool 12 is engaged with the cage 23 of the pilot valve 22 and urges the regulating spool 12 to abut the shoulder of the dampening guide 17, which remains engaged with the metering guide 11 as the compensating spring 19 can be configured such that it is stronger than the regulating spring 48.

In one embodiment of the invention, the inventive valve is a "normally-closed" type, as shown in FIG. 1, which means that the valve is in a closed position when the actuator is not triggered (in this case, when no current is applied to the actuator coil). In this position, the cross holes 29 of the pilot spool 27 misalign with the groove 26 in the pilot cage 23, thereby preventing flow passage through the pilot valve. The regulating spool 12 remains in an initial position in which its cross holes 13 also misalign with the groove 44 and the cross holes 43 of the metering guide 11, thereby preventing flow passage through the regulating spool 12. When the input port 4 is connected to a source of pressurized fluid, flow from the inlet port can be directed to the bypass port 6 by the shifting of the compensating spool 9 in response to force created by pressure acting on the effective area of the compensating spool 9 and overcoming the force of the compensating spring 19.

When the solenoid coil 32 of the actuator is electrically energized with current, electromagnetic forces substantially proportional to current level are induced on the armature. As the forces exceed the force of the pilot spring 30, the armature 34 moves toward the pole piece 35. The pilot spool 27 moves together with the armature and, at a certain, predetermined point the cross holes 29 of the pilot spool 27 become aligned with the groove 26 and the cross holes 25 of the pilot cage 23 to define pilot opening areas, the area of the openings being essentially proportional to the pilot spool displacement. The opening of the pilot spool establishes fluid flow through the pilot valve and the fixed orifice 47 of the regulating spool 12. The flow through the orifice rises with an increase of the pilot opening area, thereby increasing the pressure differential across the regulating spool 12. The increasing pressure differential induces a force on the regulating spool 12 acting against the regulating spring 48 and causing spool displacement toward the actuator. As the regulating spool moves over its range of travel, at a certain, predetermined point, it establishes a connection between the cross-holes 13 in the regulating spool 12 and the groove 44 and the cross holes 43 in the metering guide 11 to define an area of opening therebetween, the area of the openings being essentially proportional to the regulating spool displacement. The opening of the regulating spool establishes fluid flow from the inlet port 4 through the cavity 16, the dampening guide 17 and the cavity 45, the groove 44 and the cross-holes 43 of the metering guide 11, the cavity 42, the cross holes 10 of the cage 7, and the cavity 14 to the priority flow port 5.

The pressure differential caused by fluid flow across the flow control valve induces a force on the compensating spool 9, which is also influenced by the compensating spring force generated by the compensating spring 19 and flow forces induced by fluid flow movement. When the compensating spool 9 is in the balanced position, the pressure differential, defined as the difference in pressure between both sides of the compensating spool 9, multiplied by the effective area of the compensating spool 9, defined as the area of the annulus between the outside diameter and the inside diameter thereof as measured at the end where it contacts the metering guide 11, is equal to the compensating spring force. Thus, the pressure differential, defined as the quotient of spring force divided by the effective spool area, is substantially constant. The pressure differential across the regulating spool 12 can be measured as the difference in pressure between the cavities 42, 45 and is substantially the same as the pressure differential across the compensating spool 9. Thus, the flow through the regulating spool 12, also called the priority flow, depends mostly on the regulating spool opening area and remains substantially the same regardless of the pressure induced by the load in the priority or the bypass lines.

Figure 2:
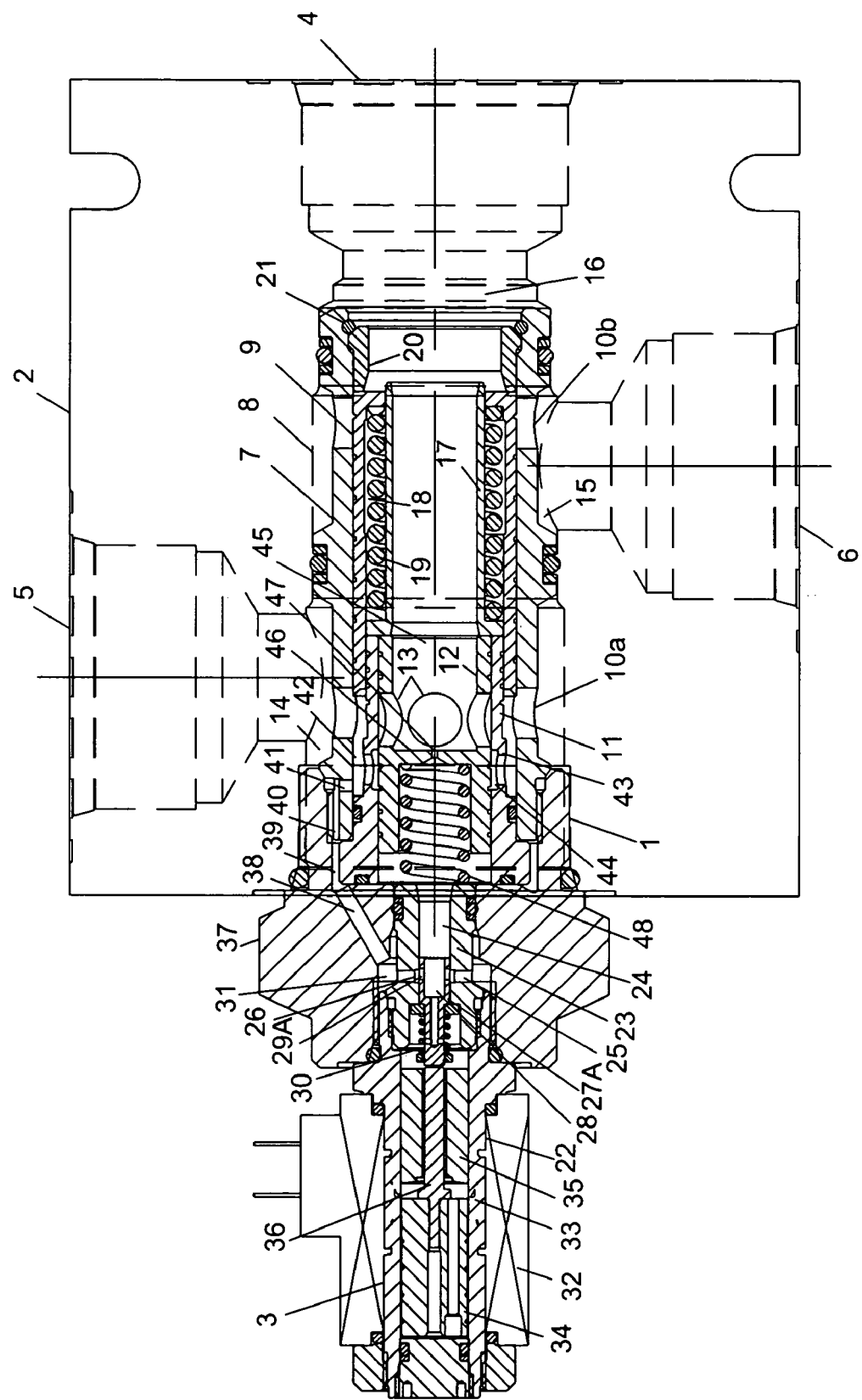
FIG. 2 is an elevational section view of another embodiment of a valve according to the present invention with the valve being a "normally-open" type and having an electromagnetic actuator.

Referring to FIG. 2, another embodiment of the invention is shown. The inventive valve in FIG. 2 is a "normally-open" type, which means that the valve is in an open position when the actuator is not operated (in this case, when no current is applied to the actuator coil). In this position, the cross holes 29A of the pilot spool 27A align with the groove 26 in the pilot cage 23, providing a flow passage through the pilot valve 22. The regulating spool 12 in this case switches to the upper position as soon as the inlet port 4 is connected to a source of pressurized fluid. In this position, its cross holes 13 also align with the groove 44 and the cross holes 43 of the metering guide 11, providing maximum open area for flow passage through the metering spool and establishing the priority flow at maximum value. Excessive flow from the inlet port 4 can be directed to the bypass port 6 by the shifting of the compensating spool 9 in response to force created by pressure acting on the effective spool area and overcoming the force of the compensating spring 19.

When the solenoid coil 32 of the actuator 3 is electrically energized with current, electromagnetic forces substantially proportional to current level are induced on the armature 34. As the forces exceed the force of the pilot spring 30, the armature 34 moves toward the pole piece 35. The pilot spool 27A moves together with the armature 34, in turn reducing the pilot opening area, the area of opening being substantially inversely proportional to the pilot spool displacement. At a certain, predetermined point along the range of travel, the cross holes 29A of the pilot spool 27A become misaligned with the groove 26 and the cross holes 25 of the pilot cage 23. The opening of the pilot spool 27A establishes fluid flow through the pilot valve 22 and the fixed orifice 47 of the regulating spool 12. The flow through the orifice 47 diminishes with the reduction of the pilot spool opening area, thereby reducing the pressure differential across the regulating spool 12. The area of the opening is substantially inversely proportional to the regulating spool displacement. The reduction of the pressure differential induces a reduced force on the regulating spool 12 acting against the regulating spring 48 and causes spool displacement in the direction opposite to the actuator. As the regulating spool 12 moves, at a certain, predetermined point along its range of travel, it disconnects the communication between the cross holes 13 in the regulating spool 12 and the groove 44 and the cross holes 43 in the metering guide 11. At this point, the valve is in a closed position substantially preventing any priority flow except a small leakage flow through the valve spools.

The normally-open valve shown in FIG. 2 can be similar to the normally-closed valve shown in FIG. 1 in other respects.

Figure 3:
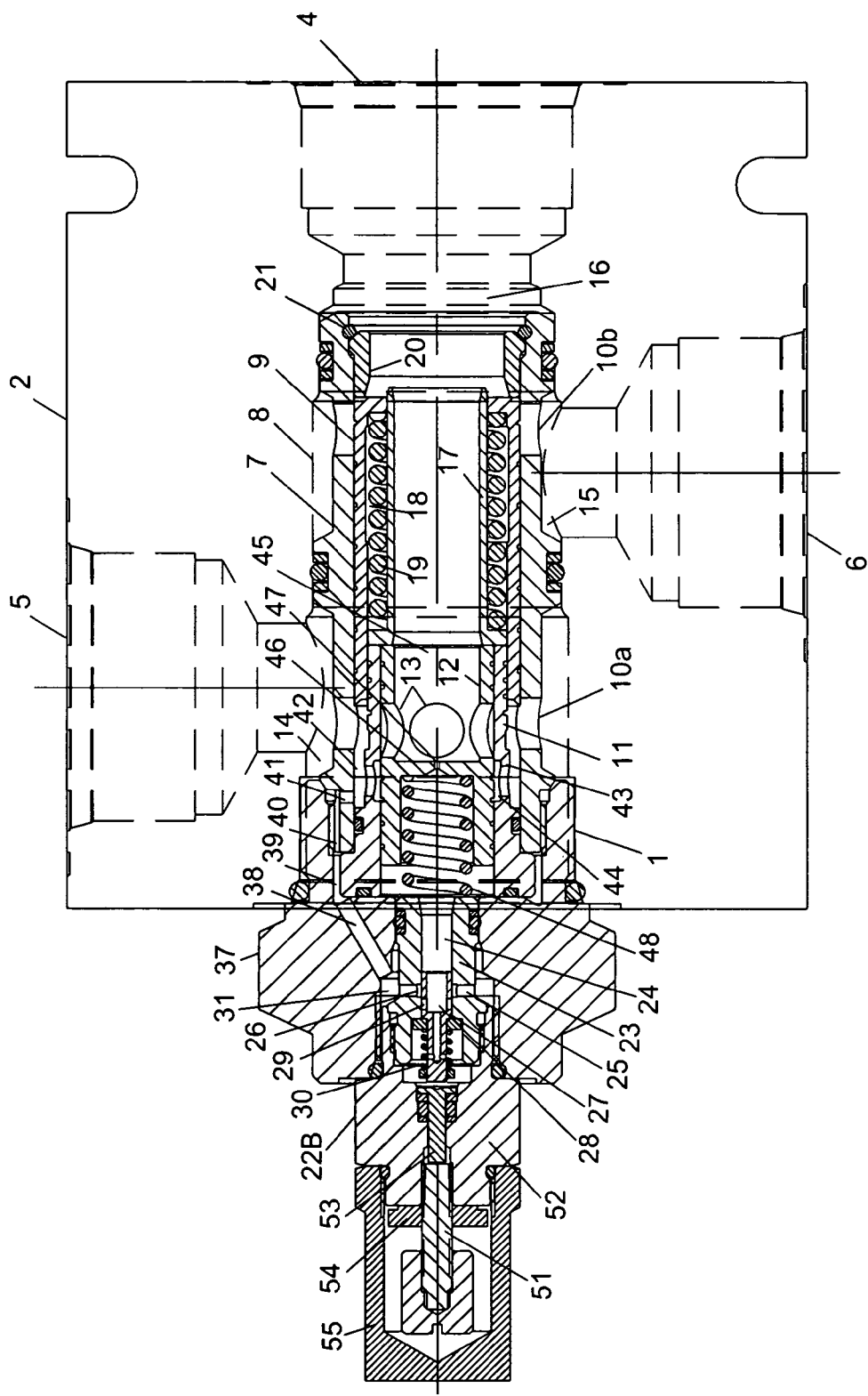
FIG. 3 is an elevational section view of another embodiment of a valve according to the present invention with the valve having a mechanical actuator.

Referring to FIG. 3, another embodiment of a valve according to the present invention is shown. The inventive valve in FIG. 3 is similar to the valve shown in FIG. 1 except that it has a mechanically-operated pilot spool instead of one operated by an electro-magnetic solenoid.

In this embodiment, the pilot spool displacement is provided, for example, with an adjusting screw 51 extending from a valve adaptor 52 via an intermediate pin 53. The valve adaptor 52 can engage the end of the pilot spool 23. The adjusting screw 51 can be threadedly engaged to at least one of the valve adaptor 52 and a lock nut 54 and in this embodiment is threadedly engaged to both. The pilot spring 30 maintains the pilot valve 22B in the closed (no flow) position. Rotating the adjusting screw 51 causes the screw to translate along its longitudinal axis, thereby displacing the pilot spool 27. At a certain predetermined point along the range of longitudinal travel of the screw, the cross holes 29 of the pilot spool 27 become aligned with the groove 26 and the cross holes 25 of the pilot cage 23, with the area of opening being substantially proportional to the pilot spool displacement. The opening of the pilot spool establishes fluid flow through the pilot valve and the fixed orifice of the regulating spool. The adjusting screw 51 can be rotated in the opposite direction to return the pilot spool to the closed position. The valve can also include a cap 55.

The valve of FIG. 3 is similar in other respects to the solenoid-operated, normally-closed pilot operated valve shown in FIG. 1.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

While the invention is described herein in connection with certain preferred embodiments, there is no intent to limit the present invention to those embodiments. On the contrary, it is recognized that various changes and modifications to the described embodiments will be apparent to those skilled in the art upon reading the foregoing description, and that such changes and modifications may be made without departing from the spirit and scope of the present invention. The inventors expect skilled artisans to employ such variations as appropriate, and the inventors intend for the invention to be practiced otherwise than as specifically described herein. Accordingly, the intent is to cover all alternatives, modifications, and equivalents included within the spirit and scope of the invention. Moreover, any combination of the above-described elements in all possible variations thereof is encompassed by the invention unless otherwise indicated herein or otherwise clearly contradicted by context.

What is claimed is:

1. A proportional, pilot-operated flow control valve comprising:
   a housing, the housing having a chamber and at least one port communicating with the chamber;
   a cage supported by the housing, the cage having a plurality of cross holes, the cage having an open end, the cage having a stop;
   a hollow compensating spool slidably disposed within the cage, the spool having a shoulder;
   a hollow metering guide member slidably disposed within the compensating spool;
   a regulating spool slidably disposed within the guide member, the regulating spool having a plurality of metering cross holes;
   a dampening guide slidably disposed inside the compensating spool to define a dampening chamber between the shoulder of the spool and the dampening guide, the dampening guide having a shoulder;
   a compensating spring disposed inside the dampening chamber and arranged to urge the dampening guide to engage the metering guide and to urge the compensating spool to engage the stop of the cage;
   a regulating spring disposed inside the regulating spool, the regulating spring being engaged with the cage and urging the regulating spool to abut the shoulder of the dampening guide; and
   a cartridge, the cartridge having a pilot valve assembly and an adaptor, the adaptor mounted to the cage, the pilot valve assembly mounted to the adaptor, the pilot valve assembly including an actuator.

2. The valve according to claim 1, wherein the actuator is electro-magnetic.

3. The valve according to claim 2, wherein the actuator comprises a solenoid coil.

4. The valve according to claim 1, wherein the actuator is mechanical.

5. The valve according to claim 4, wherein the actuator comprises an adjusting screw.

6. The valve according to claim 1, wherein the valve is a normally-closed type.

7. The valve according to claim 1, wherein the valve is a normally-open type.

8. The valve according to claim 1, wherein the pilot valve assembly comprises a pilot cage, a pilot spool, and a pilot spring, the pilot cage with an axial hole and a plurality of cross holes connected with a groove and facing the pilot spool, the pilot spool including an axial hole and a plurality of cross holes, the pilot spool slidably disposed within the pilot cage, the pilot spring maintaining the pilot spool in an initial defined position.

9. The valve according to claim 8, wherein the housing defines a cavity and the pilot valve assembly defines a pilot cavity, the housing cavity and the pilot cavity connected by at least one hole in the adaptor, a cavity arranged outside of the metering guide shoulder, a groove and a plurality of holes in the hollow cage to a cavity inside of the cage.

10. The valve according to claim 8, wherein the metering guide has a plurality of cross-holes formed therein and an internal groove facing the outside diameter of the regulating spool, and the regulating spool includes a wall with a fixed orifice.

11. The control valve according to claim 1, wherein the regulating spool includes a wall with a fixed orifice.

12. A proportional, pilot-operated flow control valve comprising:
  a cage;
  a hollow compensating spool slidably disposed within the cage;
  a hollow metering guide member slidably disposed within the compensating spool;
  a regulating spool slidably disposed within the guide member;
  a dampening guide slidably disposed within the compensating spool and defining a dampening chamber therein;
  a compensating spring disposed within the dampening chamber and configured to urge the dampening guide into engagement with the metering guide and to urge the compensating spool into engagement with the cage;
  a regulating spring disposed within the regulating spool and configured to urge the regulating spool into engagement with the dampening guide; and
  a cartridge, the cartridge having a pilot valve and an adaptor, the adaptor mounted to the cage, the pilot valve mounted to the adaptor and the pilot valve including an actuator.

13. A proportional, pilot-operated flow control valve comprising:
  a regulating spool which is selectively movable over a range of travel between a closed position wherein flow passage through the regulating spool is substantially prevented and an open position wherein full passage is substantially completely allowed, with flow passage being substantially proportionally variable in relation to the position of the spool over the range of travel;
  a pilot valve operably arranged with the regulating spool to selectively control the position of the regulating spool;
  a compensation assembly for maintaining a substantially constant pressure drop across the regulating spool; and
  a dampening guide, the dampening guide cooperating with the compensation assembly to define a dampening chamber.

14. The flow control valve according to claim 13, wherein the pilot valve comprises a cartridge, the pilot valve being disengageable from the regulating spool.

15. The control valve according to claim 13, wherein the compensation assembly includes a compensating spool and a compensation spring, the dampening guide slidably disposed inside the compensating spool, the compensation spring disposed inside the dampening chamber.

16. The control valve according to claim 15, wherein the compensating spool is movable in response to a source of pressurized fluid such that the compensating spool moves once the pressure exceeds a predetermined amount to allow flow through a bypass passage.

* * * * *